(12) United States Patent
Wu et al.

(10) Patent No.: US 11,177,587 B1
(45) Date of Patent: Nov. 16, 2021

(54) GROUND LUG HOLDER

(71) Applicant: Facebook, Inc., Menlo Park, CA (US)

(72) Inventors: Jiayi Wu, San Jose, CA (US); Che Kin Leung, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/824,441

(22) Filed: Mar. 19, 2020

(51) Int. Cl.
| | | |
|---|---|---|
| *H01R 4/12* | (2006.01) | |
| *H01R 4/00* | (2006.01) | |
| *H01R 4/64* | (2006.01) | |
| *H01R 4/48* | (2006.01) | |
| *H01R 11/12* | (2006.01) | |

(52) U.S. Cl.
CPC ............. *H01R 4/54* (2013.01); *H01R 4/489* (2013.01); *H01R 4/64* (2013.01); *H01R 11/12* (2013.01)

(58) Field of Classification Search
CPC ... H01R 4/30; H01R 4/34; H01R 4/40; H01R 4/54; H01R 4/489; H01R 4/64; H01R 4/66; H01R 11/12; H01R 13/648; H01R 13/6485; H01R 13/6596; H01R 43/40; H02G 15/02
USPC ..... 174/74 R, 78, 84 R, 88; 439/84, 86, 782, 439/109, 92–100, 939, 927
See application file for complete search history.

(56) References Cited

U.S. PATENT DOCUMENTS

| | | | | |
|---|---|---|---|---|
| 5,697,797 | A * | 12/1997 | Wendel | H01Q 1/1214 411/342 |
| 6,991,478 | B2 * | 1/2006 | Girinon | B64D 45/02 439/92 |
| 10,182,495 | B2 * | 1/2019 | Svensson | H05K 5/0247 |
| 2007/0270002 | A1 * | 11/2007 | Braden | H01R 4/646 439/92 |
| 2010/0059246 | A1 * | 3/2010 | Wakileh | G02B 6/4477 174/78 |

* cited by examiner

*Primary Examiner* — William H. Mayo, III
(74) *Attorney, Agent, or Firm* — Van Pelt, Yi & James LLP

(57) ABSTRACT

A device includes a body portion and a moveable fastener extension coupled to the body portion. The moveable fastener extension is configured to be inserted in an opening of an electrical ground lug and an opening of an object to be grounded. The device further includes a handle coupled to the moveable fastener extension and configured to be operated by hand to manipulate the moveable fastener extension to secure the electrical ground lug to the object via the device.

20 Claims, 7 Drawing Sheets

GROUND LUG HOLDER

BACKGROUND OF THE INVENTION

Electrical devices need to be grounded to a ground source to allow safe electrostatic discharge and protect an operator from an electrical shock. Often a ground lug that terminates an end of a wire connected to a ground source is attached to a metal chassis of a device to ground it. The ground lug is typically screwed into the device chassis using a screw and a screw driver.

BRIEF DESCRIPTION OF THE DRAWINGS

Various embodiments of the invention are disclosed in the following detailed description and the accompanying drawings.

DETAILED DESCRIPTION

Figure 1:
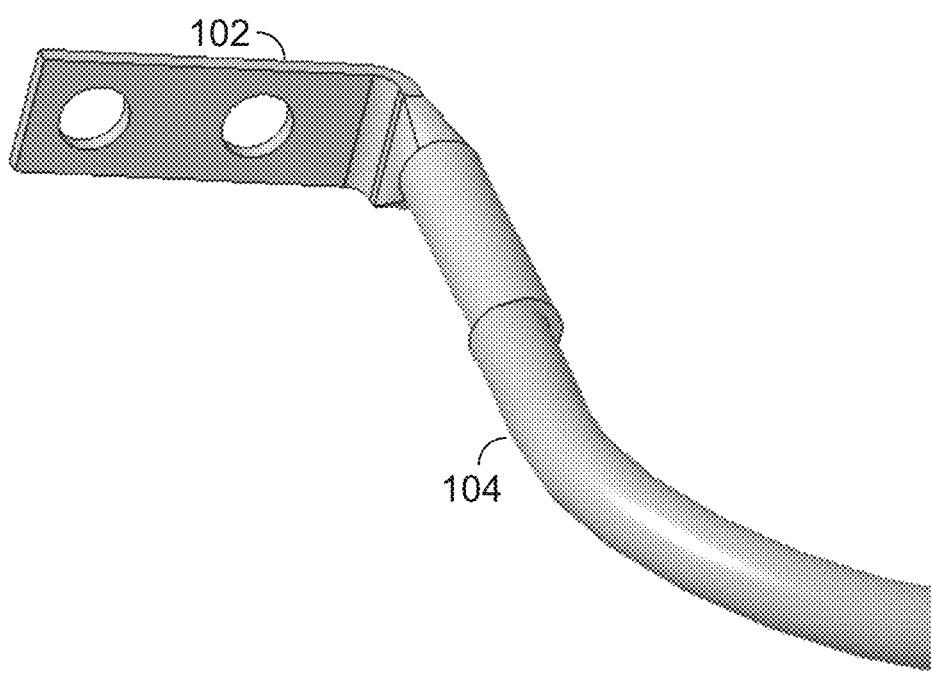
FIG. 1 is a diagram of an example ground lug. Ground lug 102 is coupled to wire 104 that is attached to an electrical ground source.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When screws are used to secure ground lugs to devices, a screw driver tool is required to manipulate screws to attach or remove the ground lug. This adds to the amount of items that need to be carried by a technician. Also, it is difficult to identify a loose screw apart from a properly secured screw without careful examination. This may lead to a ground lug that appears to be attached but is in fact not making proper contact to ground an electronic device. Loose screws are also easy dropped or lost during operation. Additionally, when hundreds of devices of a data center need to be attached or removed from corresponding ground lugs, any reduction in the amount of time required to attach or remove the ground lugs from devices adds to operational efficiency.

In some embodiments, a ground lug holder device includes a body portion. A moveable fastener extension is coupled to the body and configured to be inserted in an opening of the electrical ground lug and an opening of an object to be grounded (e.g., chassis of an electrical device). A handle is coupled to the extension and configured to be operated by hand to secure the ground lug to the device chassis via the fastener extension. For example, the ground lug holder allows a ground lug to be attached to a device chassis without requiring an external tool such a screw driver due to the built in handle that can be directly manipulated by hand to attach and disengage the holder from the device chassis. An example of the fastener extension is a T-shaped tip rod that passes through the ground lug and the electrical device chassis while the body portion of the holder pushes against the ground lug to secure the ground lug against the electrical device chassis. In some embodiments, a retainer extension fits inside a keyed hole of the object to be grounded and allows the holder to remain retained on the object to be grounded when the ground lug and the moveable fastener extension are disengaged from the object to be grounded. These improvements eliminate the need for external tools and minimize the risk of dropping or losing the holder while also reducing hardware install and uninstall times for operators during system installation and replacement to improve operational efficiency and productivity.

FIG. 1 is a diagram of an example ground lug. Ground lug 102 is coupled to wire 104 that is attached to an electrical ground source (e.g., ground source on a data center rack, ground busbar, or other electrical ground source). Ground lug 102 has two holes that can be utilized to retain the ground lug to an object to be grounded (e.g., an electrical device to be grounded). For example, ground lug 102 is made of a conductive metal that is electrically connected to the ground source via wire 104 and the object to be grounded can be grounded by electrically contacting ground lug 102 to the object and securing ground lug 102 to the object. Ground lug 102 is merely an example and other types/shapes of ground lugs may be utilized in other embodiments. For example, a ground lug with a single hole is retained using an embodiment of a ground lug holder.

Figure 2:
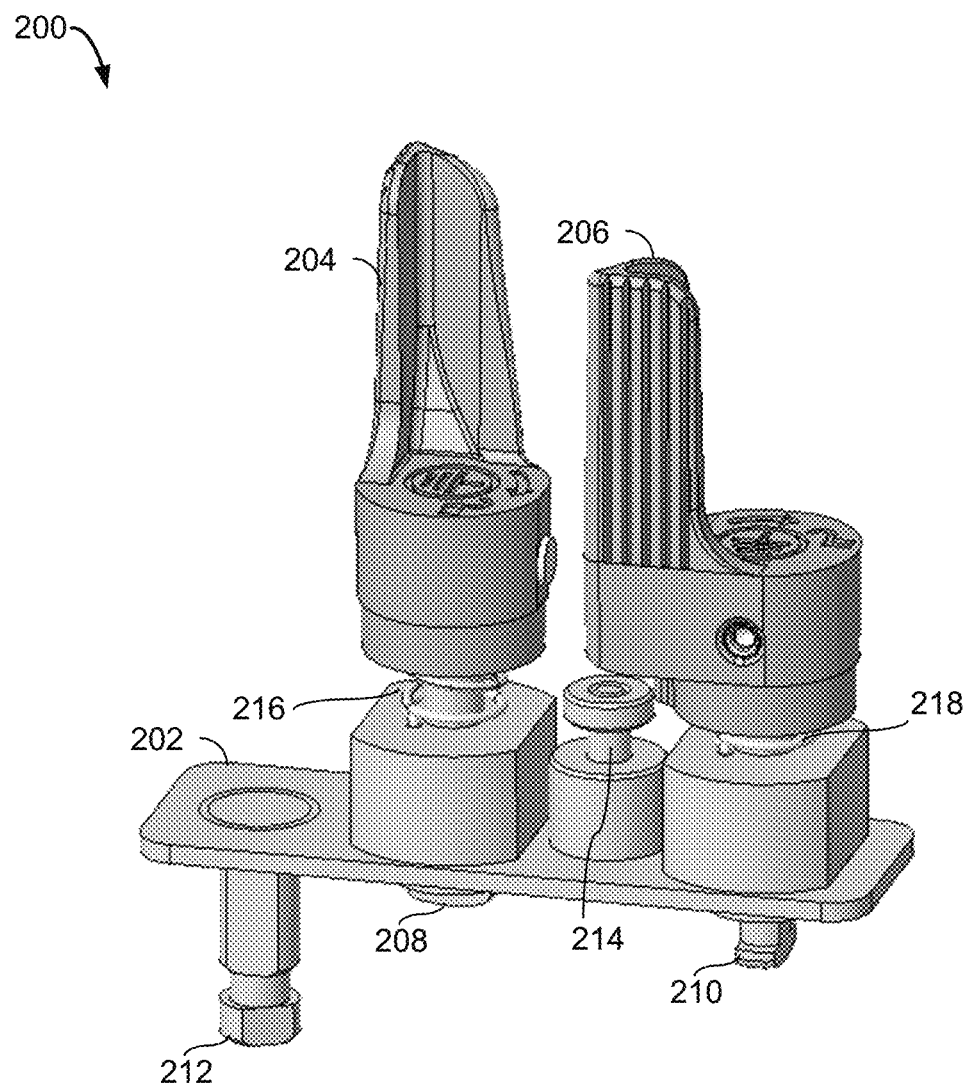
FIG. 2 is a diagram illustrating a top profile view of an embodiment of a ground lug holder.
Figure 3:
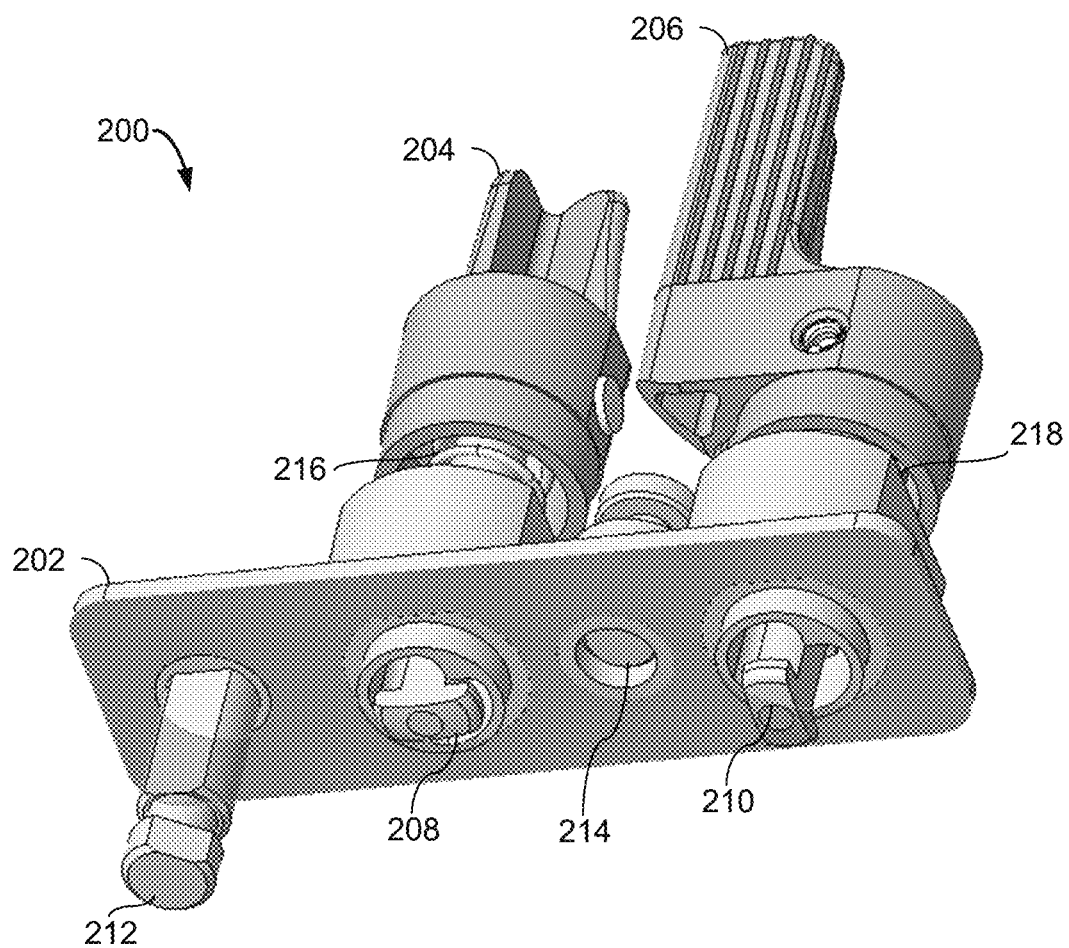
FIG. 3 is a diagram illustrating a bottom profile view of an embodiment of a ground lug holder.

FIG. 2 is a diagram illustrating a top profile view of an embodiment of a ground lug holder. FIG. 3 is a diagram illustrating a bottom profile view of an embodiment of a ground lug holder. Ground lug holder 200 includes body 202 that provides a structural medium that other components of holder 200 are coupled to. For example, body 202 is a metal plate that serves as the main structural component. Ground lug holder 200 includes handle 204 and handle 206.

Handle 204 is attached to moveable fastener extension 208, and fastener extension 208 can be manipulated using handle 204. For example, handle 204 can be pushed to push out fastener extension 208 from a ground lug contact facing the side of body 202 and can be pulled back to pull back fastener extension 208 into the ground lug contact facing the side of body 202 (e.g., fastener extension 208 can be rotated and moved in/out). Fastener extension 208 can be inserted through an opening/hole of a ground lug and an opening/hole of an object to be grounded to secure the ground lug to the object to be grounded. The T-shaped end of fastener extension 208 also rotates with rotation of handle 204 and can be rotated to a first orientation that allows it to freely enter the opening of the object to be grounded and then after be rotated (e.g., 90 degree quarter-turn) to a different second orientation that allows the side extensions of the T-shaped end to catch and contact a rear side of the opening of the object to be grounded to prevent the T-shaped end from exiting the opening of the object to be grounded, thereby securing ground lug holder 200 to the object while the ground lug is sandwiched in between.

Spring 216 applies a force between handle 204 and body 202 to push out handle 204 and in turn retract back fastener extension 208 into the ground lug contact facing the side of body 202. Fastener extension 208 has an internal mechanism (e.g., catch) to limit the amount fastener extension 208 and handle 204 are retracted due to spring 216. Thus spring 216 applies the continual force needed to allow the T-shaped end of extension 208 to maintain contact with the rear side of the opening of the object to be grounded. When extension 208 is inserted though the opening/hole of the ground lug and the opening/hole of the object to be grounded to secure the an ground lug to the object to be grounded, an operator applies a force on handle 204 (e.g., against the force of spring 216) to allow extension 208 to be pushed out from the ground lug contact facing the side of body 202. When an operator desires to release the ground lug from the object being grounded, the user can push handle 204 against the force of spring 216 to release the contact between the T-shaped end of extension 208 and the rear side of the opening of the object being grounded and/or rotate handle 204 to orientate the T-shaped end to be at the orientation that allows the T-shaped end to freely pass through the opening on the object being grounded. Handle 204 has a flat portion to allow it to be easily pushed and an extended grip portion out from the flat portion for easy rotation. Handle 204 is also not symmetrical about the axis of rotation to allow the user to easily visualize engaged (locked)/disengaged (unlocked) status corresponding to the fastened/unfastened orientations of fastener extension 208 attached to handle 204.

Handle 206 is attached to fastener extension 210, and fastener extension 210 can be manipulated using handle 206. For example, much like handle 204, handle 206 can be pushed to push out fastener extension 210 from the ground lug contact facing the side of body 202 and allowed to be pulled back to pull back fastener extension 210 into the ground lug contact facing the side of body 202 (e.g., fastener extension 210 can be rotated and moved in/out). While fastener extension 208 can be inserted through a first opening/hole of the ground lug and a first opening/hole of the object to be grounded, fastener extension 210 can be inserted through a second opening/hole of the ground lug and a second opening/hole of the object to be grounded to secure the ground lug to the object to be grounded. The T-shaped end of fastener extension 210 also rotates with rotation of handle 206 and can be rotated to a first orientation that allows it to freely enter the second opening of the object to be grounded and then after be rotated (e.g., 90 degree quarter-turn) to a different second orientation that allows the side extensions of the T-shaped end to catch and contact a rear side of the second opening of the object to be grounded to prevent the T-shaped end from exiting the opening of the object to be grounded, thereby further securing ground lug holder 200 to the object while the ground lug is sandwiched in between.

Spring 218 applies a force between handle 206 and body 202 to push out handle 206 and in turn retract back fastener extension 210 into the ground lug contact facing the side of body 202. Fastener extension 210 has an internal mechanism (e.g., catch) to limit the amount fastener extension 210 and handle 206 are retracted due to spring 218. Thus spring 218 applies the continual force needed to allow the T-shaped end of extension 210 to maintain contact with the rear side of the second opening of the object to be grounded. When extension 210 is inserted though the second opening/hole of the ground lug and the second opening/hole of the object to be grounded to secure the ground lug to the object to be grounded, an operator applies a force on handle 206 (e.g., against the force of spring 218) to allow extension 210 to be pushed out from the ground lug contact facing the side of body 202. When an operator desires to release the ground lug from the object being grounded, the user can push handle 206 against the force of spring 218 to release the contact between the T-shaped end of extension 210 and the rear side of the opening of the object being grounded and/or rotate handle 206 to orientate the T-shaped end to be at the orientation that allows the T-shaped end to freely pass through the opening on the object being grounded. Handle 206 has a flat portion to allow it to be easily pushed and an extended grip portion out from the flat portion for easy rotation. Handle 206 is also not symmetrical about the axis of rotation to allow the user to easily visualize engaged (locked)/disengaged (unlocked) status corresponding to the fastened/unfastened orientations of fastener extension 210 attached to handle 206.

In alternative embodiments, ground lug holder 200 includes only one fastener (e.g., including handle 204 and fastener extension 208) and does not include handle 206 and fastener extension 210 (e.g., for use with a ground lug that includes only one opening). In some embodiments, although handle 204 and/or 206 can be made of an insulating material (e.g., plastic polymer), body 202 and fastener extensions 208 and 210 are made of a conductive material such as a metal to increase contact area with the ground lug. Handle 204 is attached to fastener extension 208 and handle 206 is attached to fastener extension 210 in various embodiments via a screw, a rivet, adhesive, or any other attachment mechanism.

The shape of the shown handles is merely an example and other shaped handles are utilized in other embodiments. The T-shaped ends of fastener extensions 208 and 210 are also merely an example, and other shaped ends may be utilized in various other embodiments (e.g., any shape that catches an opening in one orientation while allowing passage through the opening in a different orientation). In some embodiments, fastener extension 208 and/or 210 has a screw end that screws into a threaded opening of the object to be grounded when handle 204 and/or 206 is rotated by hand.

Grounding contact pin 214 includes an extension portion that can move and push out from a side of body 202 configured to face a ground lug (the ground lug facing the side of body 202). The extension portion of grounding contact pin 214 can also move and retract back into the side of body 202 configured to face the ground lug (which in turn pushes out the opposite handle side end of grounding pin 214 from body 202). Grounding contact pin 214 is spring loaded to push out from the side of body 202 configured to face the ground lug unless pushed back by contact with the ground lug. When ground lug holder 200 is utilized to secure the ground lug on to the object to be grounded, the ground lug pushes against the extension portion of the grounding contact pin 214 to retract it back but a spring force pushes back to push the ground lug against the object to be grounded. Thus force applied by the grounding contact pin 214 against the ground lug ensures better contact between the object to be grounded and the ground lug.

Attachment extension 212 is coupled to body 202 and allows ground lug holder 200 to remain coupled to the object to be grounded while ground lug holder 200 is not being utilized to secure a ground lug. By allowing ground lug holder 200 to remain coupled to the object to be grounded while not in use, ground lug holder 200 is less likely to be dropped or lost. Additionally, because attachment extension 212 is utilized to couple ground lug holder 200 while not in use (e.g., rather than using the fastener extensions 208 and 210 to secure an empty ground lug holder with a ground lug), an operator can easily transition to using ground lug holder 200 to secure a ground lug to the object to be grounded without needing to unfasten the fastener extensions 208 and 210.

A cross-sectional shape of attachment extension 212 is keyed (e.g., D-shaped) to be inserted in a corresponding shaped opening/hole on the object to be grounded. Although a cross-sectional shape of attachment extension 212 is shown as a D-shape, other shapes may be utilized in other embodiments. A cross-sectional shape of a tip portion of attachment extension 212 is orientated in one orientation while a cross-sectional shape of a different body portion of extension 212 is orientated in another orientation (e.g., two different D-shaped orientations) with a groove in between the different orientations. These different orientations of attachment extension 212 prevent attachment extension 212 from being inadvertently pulled out completely from the shaped opening on the object to be grounded when ground lug holder 200 is pulled away to disconnect fastener extensions 208 and 210 from the object being grounded. For example, when ground lug holder 200 is pulled straight away while the cross-sectional shape orientation of the body portion of attachment extension 212 is aligned in an orientation matching the orientation of the shaped opening that the attachment extension 212 has been inserted in to, the cross-sectional shape orientation of the tip portion of attachment extension 212 catches against the back of the shaped opening due to the misalignment of the cross-sectional shape orientation of the tip portion with the cross-sectional orientation of the shaped opening/hole of the object to be grounded. To completely remove ground lug holder 200 from the object to be grounded, ground lug holder 200 can be reoriented to align the cross-sectional shape orientation of the tip portion with the cross-sectional orientation of the shaped opening and pulled out (e.g., same orientation utilized to initially insert the attachment extension 212 into the shaped opening/hole).

When ground lug holder 200 is not being utilized to secure a ground lug, ground lug holder 200 may hang on the shaped opening at the groove of attachment extension 212. In some embodiments, this orientation alignment to remove/insert the attachment extension 212 from the object requires the ground lug holder 200 to be rotated about the attachment extension such that a far opposite end of ground lug holder 200 from attachment extension 212 points at an angle above a horizontal axis. For example, when ground lug holder 200 hangs on the object to be grounded on attachment extension 212, it naturally rotates about attachment extension 212 such that the far opposite end portion of ground lug holder 200 points down at an angle below the horizontal axis due to gravity. By requiring the ground lug holder 200 to be rotated about the attachment extension 212 to have the opposite far end of ground lug holder 200 point at an angle above the horizontal axis to remove/insert attachment extension 212 from the shaped opening, it ensures that ground lug holder 200 will not fall out from the shaped opening when it is hanging at its rest state via attachment extension 212.

Figure 4:
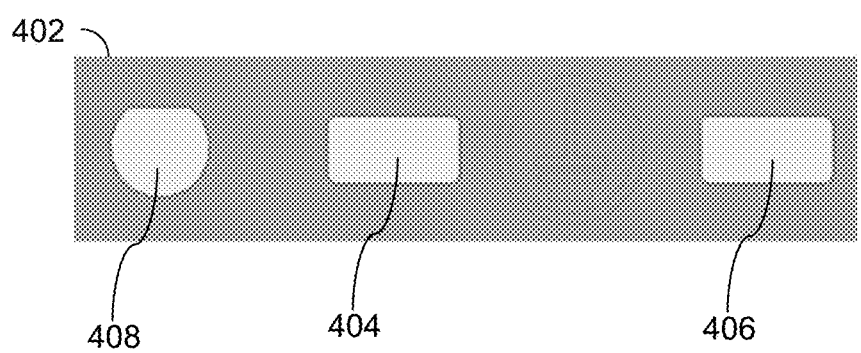
FIG. 4 is a diagram of a front side of a panel portion of an object to be grounded configured to receive a ground lug holder.

FIG. 4 is a diagram of a front side of a panel portion of an object to be grounded configured to receive a ground lug holder. For example, panel portion 402 is configured to receive ground lug holder 200. Examples of the object to be grounded include a networking device, a data center device, a server, a switch, or any other electronic device. In some embodiments, the shown panel portion 402 is a part of a device chassis (e.g., a portion of a front panel or a back panel of the device). Panel portion 402 is made of a conductive material (e.g., metal) to allow electrical discharge between the object to be grounded and the ground lug. Thus panel portion 402 is configured to make direct contact with a ground lug and includes opening 404 configured to receive an inserted fastener extension (e.g., inserted through an opening of the ground lug prior to being inserted into opening 404) in a first orientation and rotated to be in a second orientation to latch on to a rear side of panel portion 402 around opening 404 to secure the ground lug holder and the ground lug onto the front side of panel portion 402. For example, opening 404 is configured to receive inserted fastener extension 208 of ground lug holder 200. Likewise, portion 402 includes opening/hole 406 configured to receive a second inserted fastener extension (e.g., inserted through a second opening of the ground lug prior to being inserted into opening 406) in a first orientation and rotated to be in a second orientation to latch on to a rear side of panel portion 402 around opening 406 to further secure the ground lug holder and the ground lug on to the front side of panel portion 402. For example, opening 406 is configured to receive inserted fastener extension 210 of ground lug holder 200.

Panel portion 402 includes opening 408 configured to receive an attachment extension of a ground lug holder to allow it to remain coupled to portion 400 while the ground lug holder is not being utilized to secure a ground lug. For example, opening 408 is configured to receive an inserted attachment extension 212 of ground lug holder 200. Opening 408 is a keyed opening with a shape (e.g., D-shaped) that corresponds to a cross-sectional shape of the inserted attachment extension of the ground lug holder. While the ground lug holder is not in use to secure a ground lug, a portion of the attachment extension of the ground lug holder can remain inserted in opening 408 and a grooved channel on the attachment extension may fit on to opening 408 to allow it to hang on opening 408.

Figure 5A:
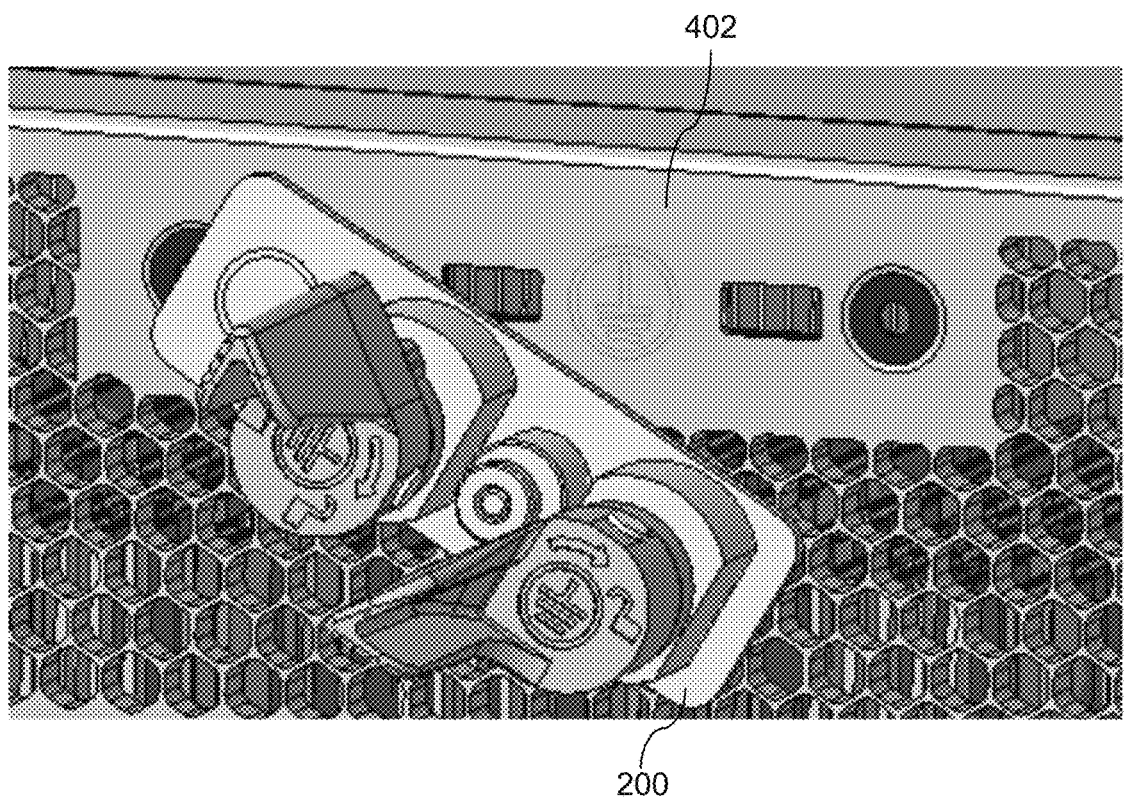
FIG. 5A and FIG. 5B are diagrams illustrating an example of using a ground lug holder to secure a ground lug to an object to be grounded.
Figure 5B:
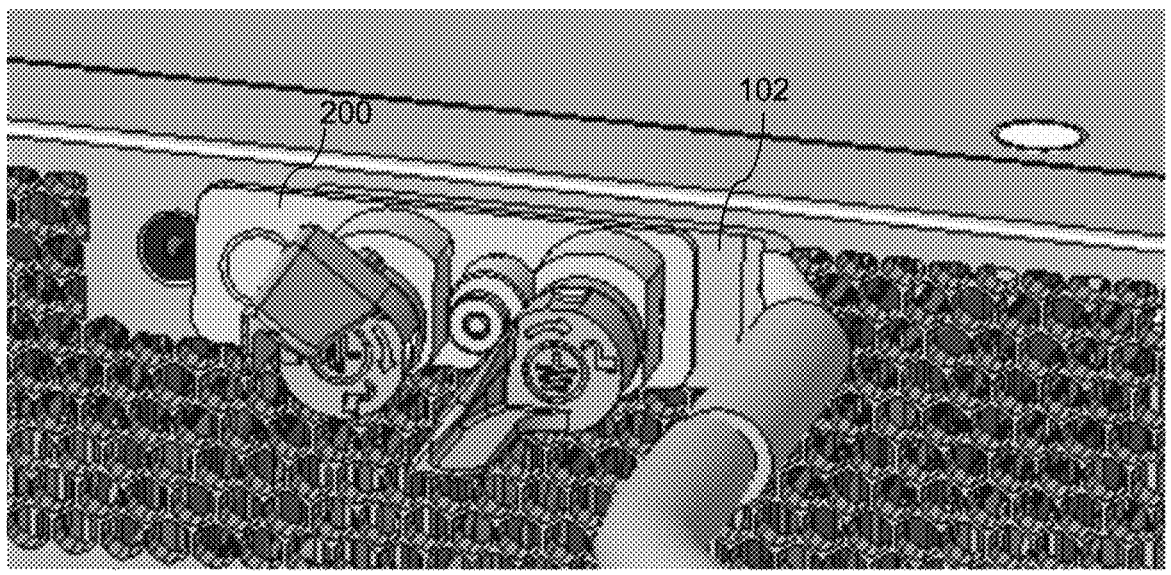

FIG. 5A and FIG. 5B are diagrams illustrating an example of using a ground lug holder to secure a ground lug to an object to be grounded. Panel portion 402 is on a device chassis and is configured to be coupled to ground lug 102 using ground lug holder 200. FIG. 5A shows ground lug holder 200 hanging on opening 408 (opening shown in FIG. 4) of panel portion 402 via attachment extension 212 (attachment extension shown in FIG. 2) of ground lug holder 200 while ground lug holder 200 is waiting to be utilized to secure ground lug 102. FIG. 5B shows ground lug holder 200 after it has been utilized to secure ground lug 102 on to panel portion 402.

Figure 6:
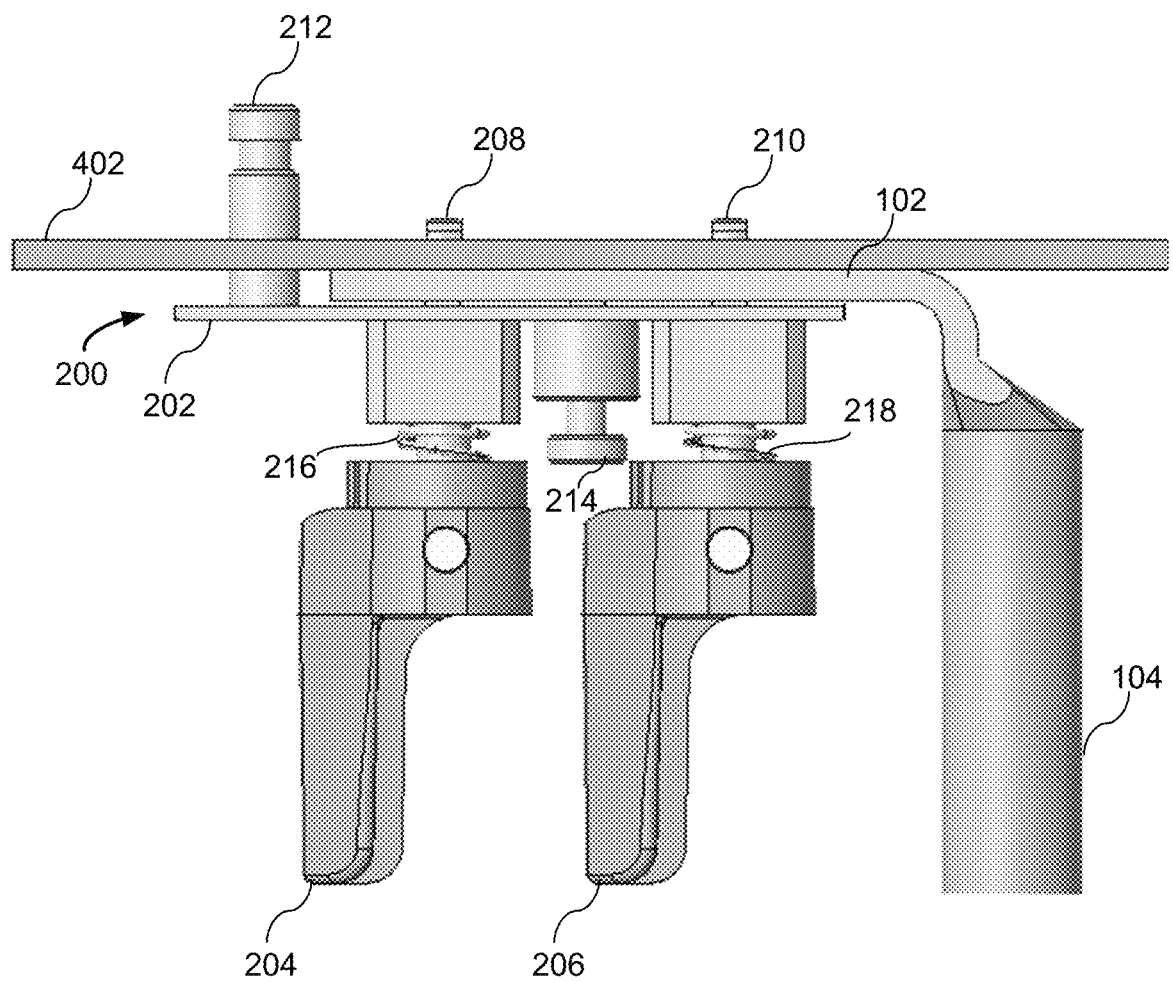
FIG. 6 and FIG. 7 are diagrams illustrating overhead views of a ground lug holder being utilized to secure a ground lug to an object to be grounded.
Figure 7:
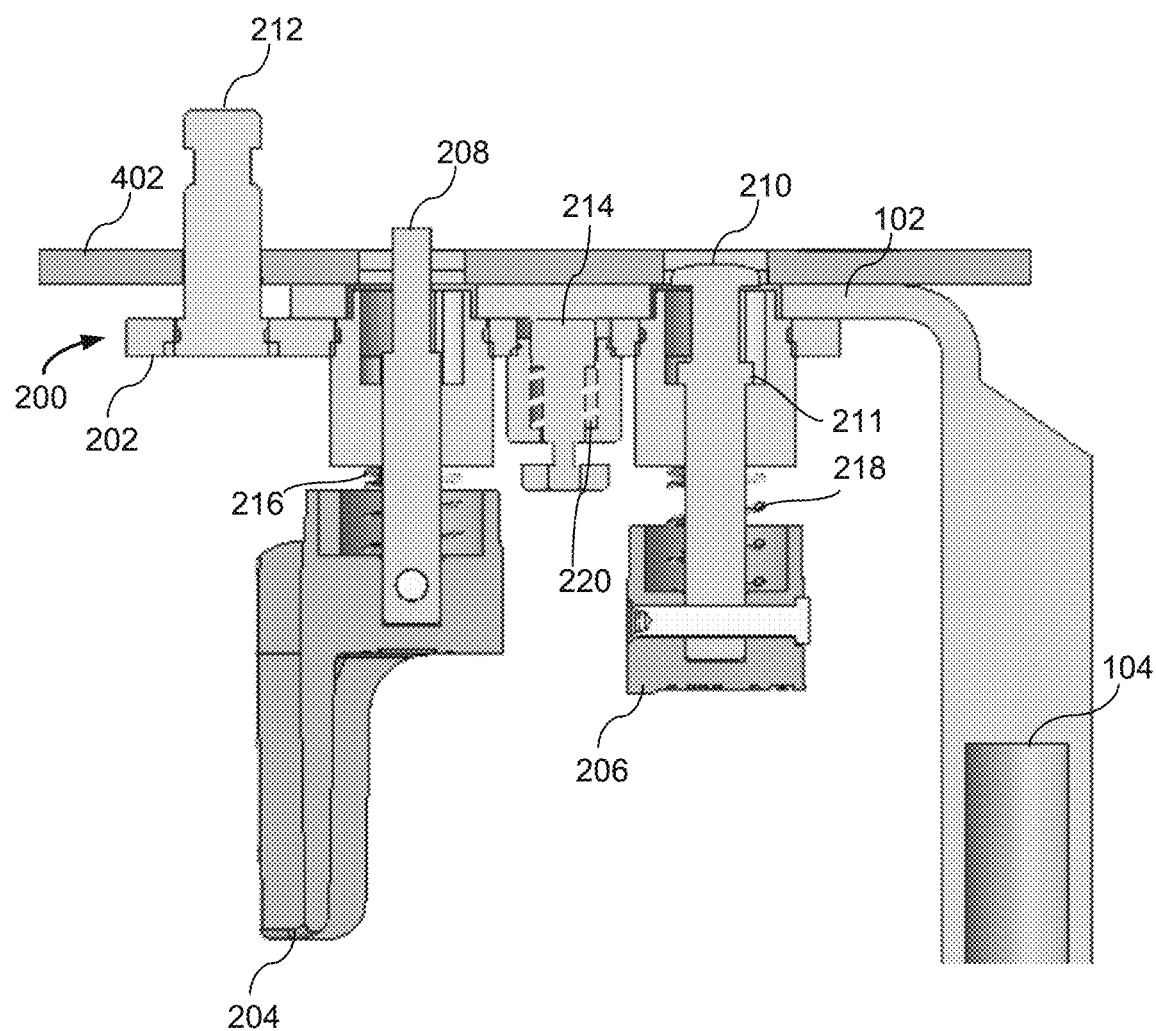

FIG. 6 and FIG. 7 are diagrams illustrating overhead views of a ground lug holder being utilized to secure a ground lug to an object to be grounded. FIG. 6 shows a cross-sectional view of panel portion 402 that is configured to maintain contact with ground lug 102 using ground lug holder 200.

Ground lug holder 200 includes handle 204 and handle 206 that are moveable (e.g., rotate and move in and out with respect to body 202). Handle 204 is attached to fastener extension 208, and fastener extension 208 can be manipulated using handle 204. Fastener extension 208 has been inserted through a first opening/hole of ground lug 102 and a first opening/hole (e.g., opening 404 shown in FIG. 4) of panel portion 402 to secure ground lug 102 to panel portion 402 of the object to be grounded. Once inserted in the first opening/hole of panel portion 402, the T-shaped end of fastener extension 208 has to be rotated using handle 204 to be at an orientation (e.g., 90 degree quarter-turn) that allows the side extensions of the T-shaped end to catch and maintain contact with a rear side of panel portion 402 around the first opening to prevent the T-shaped end from exiting the first opening of panel portion 402, thereby securing ground lug holder 200 to panel portion 402 with ground lug 102 sandwiched in between. Spring 216 applies a force between handle 204 and body 202 that pushes out handle 204 to apply a retracting force on fastener extension 208. Thus spring 216 applies the force needed to allow the T-shaped end of extension 208 to maintain contact with the rear side of panel portion 402 around its first opening.

Likewise, handle 206 is attached to fastener extension 210, and fastener extension 210 can be manipulated using handle 206. Fastener extension 210 has been inserted through a second opening/hole of ground lug 102 and a second opening/hole (e.g., opening 406 shown in FIG. 4) of panel portion 402 to secure ground lug 102 to portion 402 of the object to be grounded. Once inserted in the second opening/hole of panel portion 402, the T-shaped end of fastener extension 210 has to be rotated using handle 206 to be at an orientation (e.g., 90 degree quarter-turn) that allows the side extensions of the T-shaped end to catch and maintain contact with a rear side of panel portion 402 around the second opening to prevent the T-shaped end from exiting the second opening of panel portion 402, thereby securing ground lug holder 200 to panel portion 402 with ground lug 102 sandwiched in between. Spring 218 applies a force between handle 206 and body 202 that pushes out handle 206 to apply a retracting force on fastener extension 210. Thus spring 218 applies the force needed to allow the T-shaped end of extension 210 to maintain contact with the rear side of panel portion 402 around its second opening.

FIG. 7 shows an internal cross-sectional view of ground lug holder 200. Spring 216 is in a compressed state applying a force that pushes back fastener extension 208 to a point where the T-shaped end of fastener extension 208 catches and maintains contact with the rear side around the first opening of panel portion 402. Fastener extension 210 is in a maximum retracted state and not fastened to panel portion 402. Fastener extension 210 has internal catch 211 that catches against an internal component to limit the amount fastener extension 210 and handle 206 can be retracted back. Extension 210 has been inserted through the second opening/hole of ground lug 102 and partially in the second opening/hole of panel portion 402 but has not been fastened to the second opening/hole of panel portion 402. A user can push on handle 206 to compress spring 218 and allow extension 210 to be inserted further in and allow the T-shaped end of fastener extension 210 to clear the second opening/hole of panel portion 402. Then the T-shaped end of fastener extension 210 can be rotated to an orientation (e.g., 90 degree quarter-turn) that allows the side extensions of the T-shaped end to catch and maintain contact with the rear side around the second opening of panel portion 402.

Grounding contact pin 214 includes an extension portion that can move and extend out from a side of body 202 configured to face ground lug 102. The extension portion of grounding contact pin 214 can also move and retract back into the side of body 202 configured to face ground lug 102 (which in turn pushes out the opposite handle side end of grounding pin 214 from body 202). Grounding contact pin 214 is spring loaded using spring 220 that applies a force to push grounding contact pin 214 against ground lug 102. Thus the force applied by the grounding contact pin 214 against ground lug 102 pushes on ground lug 102 that in turn is pushed against panel portion 402 to ensure better contact between panel portion 402 and ground lug 102.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
   a fastener body portion;
   a moveable fastener extension coupled to the fastener body portion and configured to be inserted in an opening of an electrical ground lug and an opening on a chassis panel of an object to be grounded; and
   a handle coupled to the moveable fastener extension and configured to be operated by hand to manipulate at least a portion of an end of the moveable fastener extension out of the fastener body portion to insert the end of the moveable fastener extension into the electrical ground lug to secure the electrical ground lug between the fastener body portion and the chassis panel of the object to be grounded.

2. The device of claim 1, wherein the moveable fastener extension is configured to move though the fastener body portion when the handle is pressed.

3. The device of claim 1, further comprising a spring configured to provide a retracting force to retract the moveable fastener extension.

4. The device of claim 1, wherein the moveable fastener extension includes a T-shaped tip.

5. The device of claim 1, wherein a tip portion of the moveable fastener extension is configured to pass through the opening of the object to be grounded in a first orientation and the tip portion of the moveable fastener extension is configured to not pass through the opening of the object to be grounded in a second orientation.

6. The device of claim 1, wherein the electrical ground lug is secured via the device using a tip portion of the moveable fastener extension that contacts and catches on a rear side of the opening of the object to be grounded.

7. The device of claim 1, wherein the handle is configured to be rotated 90 degrees to move between a locked position securing the moveable fastener extension to the object to be grounded and an unlocked position releasing the moveable fastener extension from the object to be grounded.

8. The device of claim 1, wherein the handle is asymmetrical about an axis of rotation.

9. The device of claim 1, wherein the handle includes a flat portion configured to be pushed.

10. The device of claim 1, further comprising a second moveable fastener extension coupled to the fastener body portion and configured to be inserted in a second opening of the electrical ground lug and a second opening of the object to be grounded.

11. The device of claim 10, further comprising a second handle coupled to the second moveable fastener extension and configured to be operated by hand to manipulate the second moveable fastener extension to further secure the electrical ground lug to the object via the device.

12. The device of claim 1, further comprising an attachment extension coupled to the fastener body portion and configured to be inserted in a shaped opening of the object to be grounded.

13. The device of claim 12, wherein a cross-sectional shape of the attachment extension matching the shaped opening of the object to be grounded is at different orientations in different portions of the attachment extension.

14. The device of claim 12, wherein the attachment extension includes a grooved portion configured to hang on the shaped opening when the moveable fastener extension is not inserted in the opening of the object to be grounded.

15. The device of claim 1, further comprising a moveable contact pin configured to push the electrical ground lug on to the object to be grounded.

16. The device of claim 15, wherein the moveable contact pin is spring-loaded.

17. The device of claim 1, wherein the object to be grounded includes a metal chassis of a data center device.

18. The device of claim 1, wherein the fastener body portion includes a metal plate.

19. A device, comprising:
a fastener body portion;
a first moveable fastener extension coupled to the fastener body portion and configured to be inserted in a first opening of an electrical ground lug and a first opening on a chassis panel of an object to be grounded;
a first handle coupled to the first moveable fastener extension and configured to be operated by hand to manipulate at least a portion of an end of the first moveable fastener extension out of the fastener body portion to insert the end of the moveable fastener extension into the electrical ground lug to secure the electrical ground lug between the fastener body portion and the chassis panel of the object via the first moveable fastener extension of the device;
a second moveable fastener extension coupled to the fastener body portion and configured to be inserted in a second opening of the electrical ground lug and a second opening on the chassis panel of the object to be grounded; and
a second handle coupled to the second moveable fastener extension and configured to be operated by hand to manipulate the second moveable fastener extension to secure the electrical ground lug to the object via the second moveable fastener extension of the device.

20. An electrical device, comprising:
a grounding contact configured to be coupled to an electrical ground lug;
a first opening configured to receive a first moveable fastener extension of a ground lug holder; and
a second opening configured to receive a second moveable fastener extension of the ground lug holder;
wherein the ground lug holder includes:
a fastener body portion;
the first moveable fastener extension coupled to the fastener body portion and configured to be inserted in a first opening of the electrical ground lug and a first opening of the electrical device to be grounded;
a first handle coupled to the first moveable fastener extension and configured to be operated by hand to manipulate at least a portion of an end of the first moveable fastener extension out of the fastener body portion to insert the end of the moveable fastener extension into the electrical ground lug to secure the electrical ground lug between the fastener body portion and the chassis panel of the object via the first moveable fastener extension of the device;
a second moveable fastener extension coupled to the fastener body portion and configured to be inserted in a second opening of the electrical ground lug and a second opening on the chassis panel of the electrical device to be grounded; and
a second handle coupled to the second moveable fastener extension and configured to be operated by hand to manipulate the second moveable fastener extension to secure the electrical ground lug to the electrical device via the second moveable fastener extension.

* * * * *